United States Patent
Bauer

[11] 3,866,700
[45] Feb. 18, 1975

[54] TRACTOR VEHICLE WITH HYDROSTATIC DRIVE MEANS

[75] Inventor: James J. Bauer, Lisbon, N. Dak.

[73] Assignee: Clark Equipment Company, Buchanan, Mich.

[22] Filed: Sept. 16, 1971

[21] Appl. No.: 181,211

Related U.S. Application Data

[62] Division of Ser. No. 800,839, Feb. 20, 1969, Pat. No. 3,635,365.

[52] U.S. Cl. .............................. 180/6.48, 60/428
[51] Int. Cl. ........................................ B62d 11/04
[58] Field of Search ............... 180/6.48, 6.7, 6.66; 60/421, 428

[56] References Cited
UNITED STATES PATENTS

| | | | |
|---|---|---|---|
| 2,036,437 | 4/1936 | Ruediger | 180/6.7 X |
| 3,025,673 | 3/1962 | Brown et al. | 180/6.48 X |
| 3,065,700 | 11/1962 | Blenkle | 180/6.48 UX |
| 3,161,245 | 12/1964 | Thoma | 180/6.48 |
| 3,231,117 | 1/1966 | Melroe et al. | 180/6.66 X |

*Primary Examiner*—David Schonberg
*Assistant Examiner*—John A. Pekar
*Attorney, Agent, or Firm*—Jack E. Toliver

[57] ABSTRACT

A front-end loader having a hydrostatic drive means. The front-end loader is characterized by a pair of stanchions at the rear of the body and loader arms pivotally mounted to the stanchions projecting forwardly and downwardly on opposite sides of the operator's seat terminating at a material handling member at the lower front of the body. Means is provided for lifting the loader arms and tilting the material handling member. Two hydrostatic transmission units each consisting of a variable displacement pump and a fixed (or variable) displacement hydraulic motor serve to drivingly connect the engine with the respective wheels on each side of the body. The power system is of modular design and includes the following modular components: engine, transfer case, two hydrostatic transmissions (each including a variable displacement pump and a fixed (or variable) displacement hydraulic motor both of the swash plate type), and a gear reduction unit for each of the transmissions. The disclosure also includes an adjustable linkage for independently tilting the swash plate to vary the displacement of each hydraulic pump. The adjustability relates to varying the rate at which the pump displacement is changed per increment of movement of a control lever which actuates the linkage.

9 Claims, 20 Drawing Figures

PATENTED FEB 18 1975

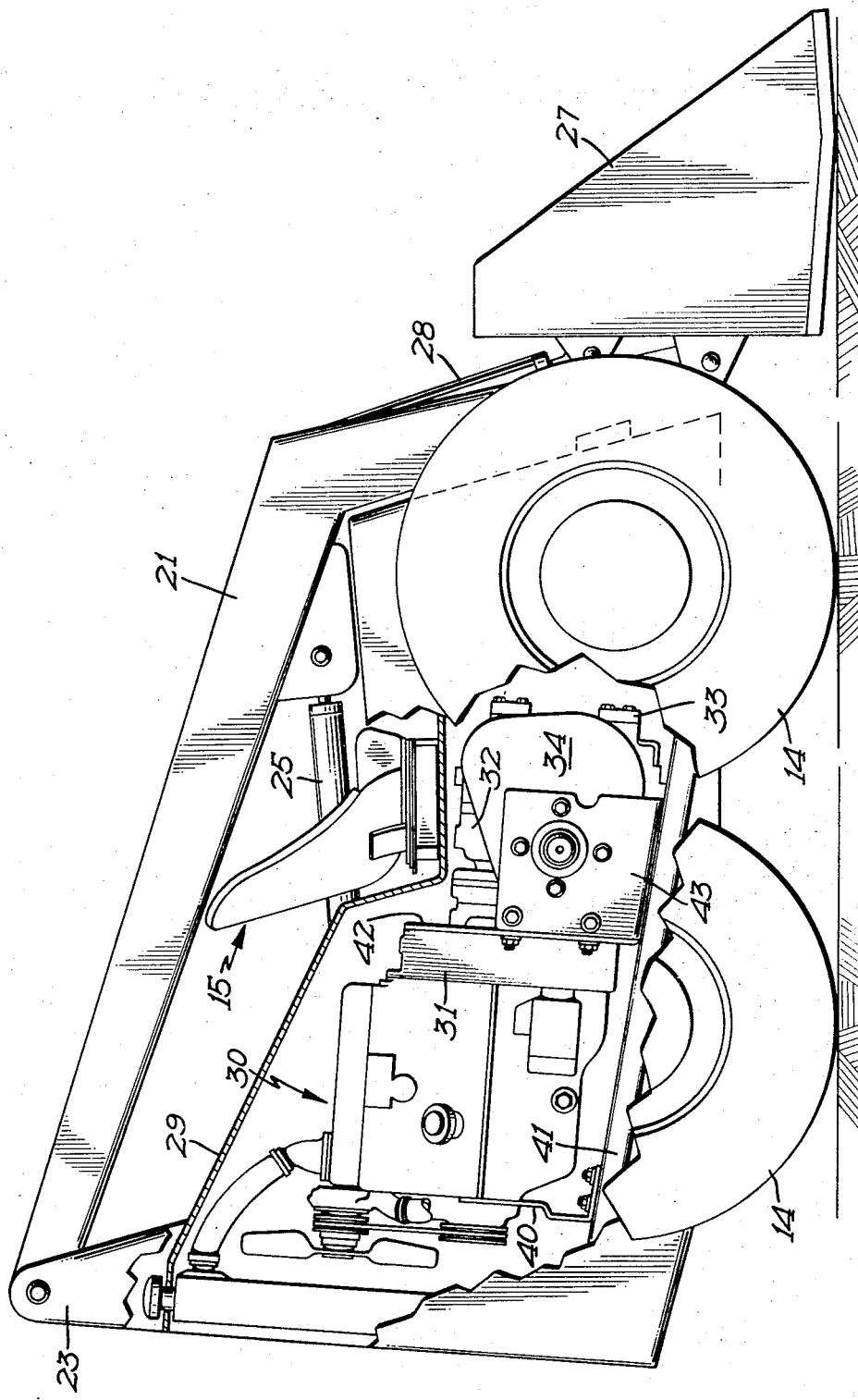

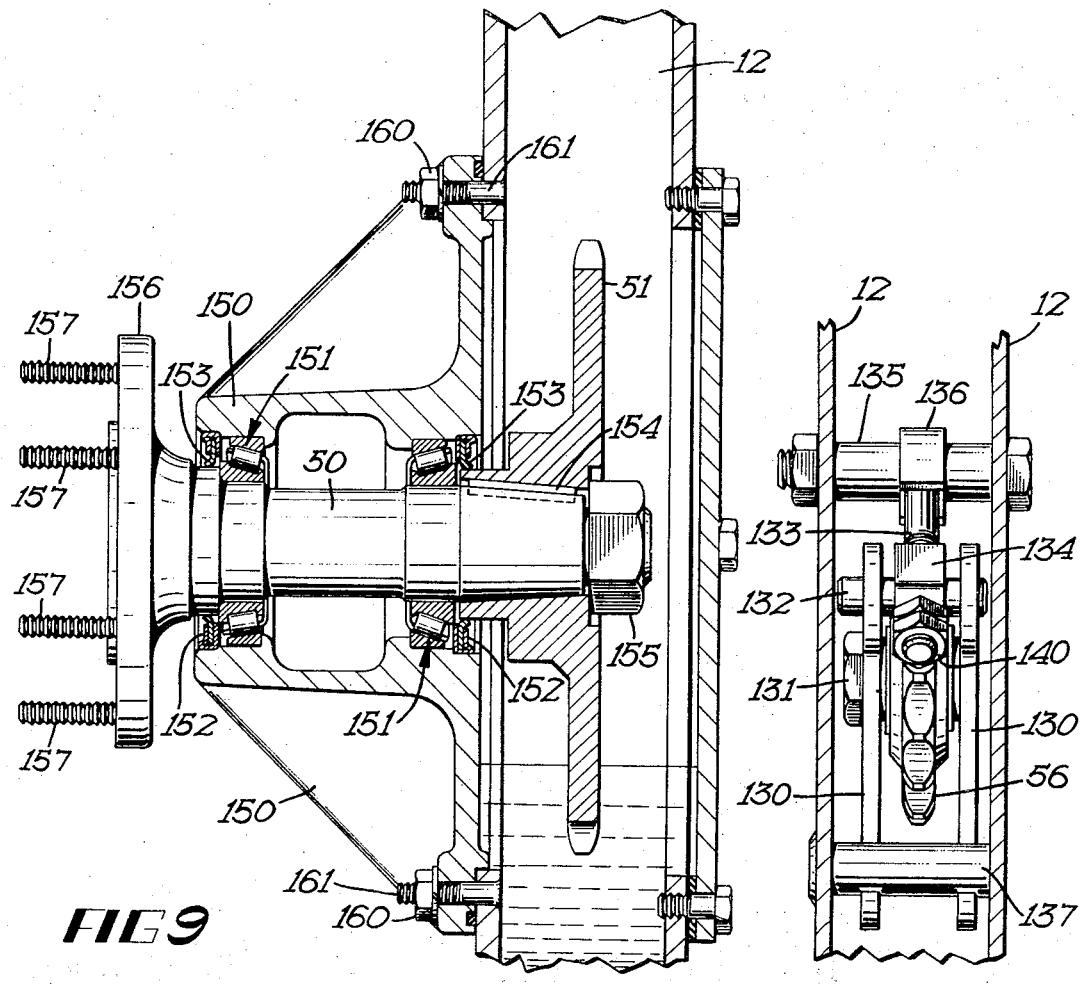
FIG 9
FIG 11
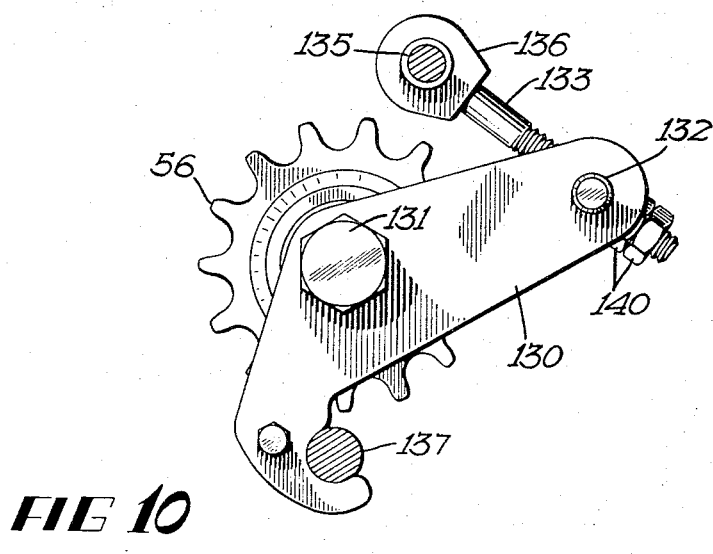
FIG 10

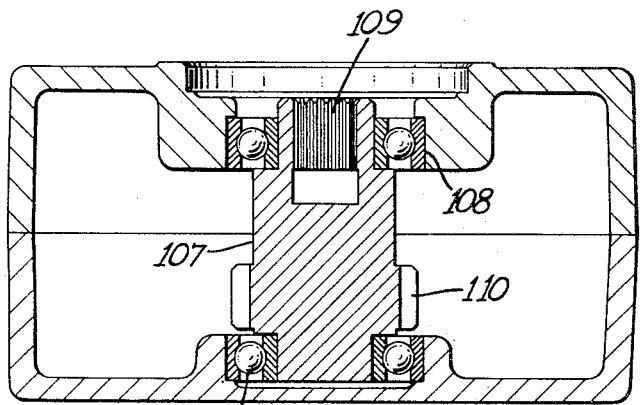
FIG 14
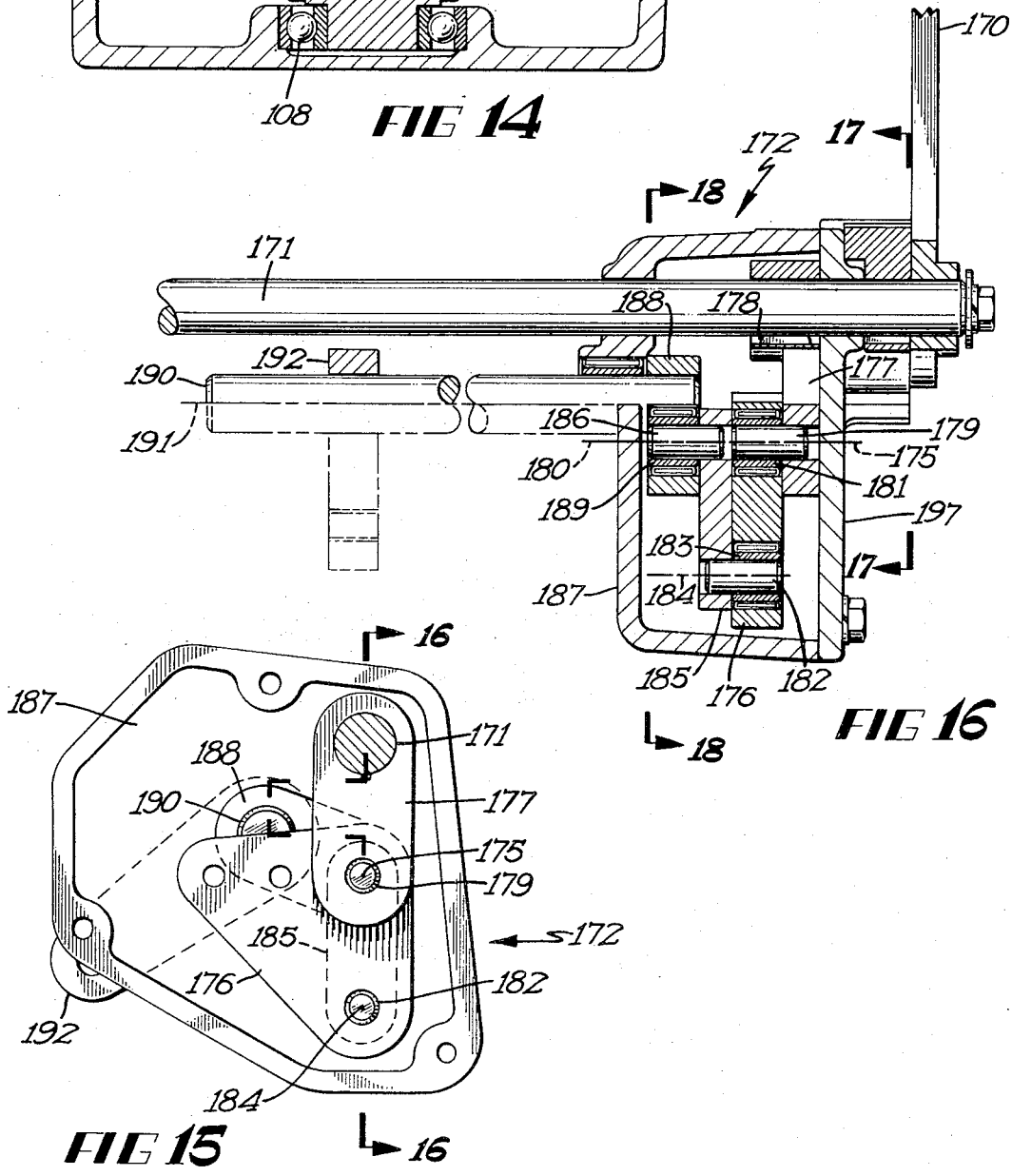
FIG 16
FIG 15

TRACTOR VEHICLE WITH HYDROSTATIC DRIVE MEANS

This is a division, of application Ser. No. 800,839, filed 2/20/69, now U.S. Pat. No. 3,635,365.

CROSS-REFERENCE TO RELATED PATENT

The present application is related to U.S. Pat. No. 3,231,117, entitled "Tractor Vehicle and Drive Therefor," issued to C. E. Melroe et al on Jan. 25, 1966, and partially assigned to the assignee of the present invention. The present invention includes many features included in the prior related patent but departs therefrom primarily in that modular hydrostatic power transfer means is provided between the engine and the wheels. To the extent the body structure is the same or similar to that described in U.S. Pat. No. 3,231,117, reference is made to columns 2, 3, 7 and 8, lines 23 – 30; 8 – 12; 38 – 57; 69 – 75 and 1-5, respectively which shall be incorporated herein by reference.

BACKGROUND OF THE INVENTION

The present invention relates to the field of compact, highly-maneuverable, wheel-mounted, front-end loaders. More particularly, it relates to such loaders wherein hydrostatic transmission means connects the engine with the wheels for smooth efficient control of wheel speed and direction. As used in connection with the present invention the term "hydrostatic" means a variable displacement pump and a fixed (or variable) displacement hydraulic motor actuated by the pump output. The present invention also relates to the field of modular design in drive system components. It also relates to the field of adjustable linkages wherein a pivotal output (such as pivotal movement of a lever) can be varied as a function of pivotal input (such as pivotal movement of a lever). This is particularly useful in controlling the plane of the swash plate in a conventional hydrostatic transmission unit.

Hydraulic drive systems in a front-end loader of the type disclosed in Melroe U.S. Pat. No. 3,231,117 are not new. Hydraulic drive systems are disclosed in Olson U.S. Pat. No. 3,279,637 and also in White U.S. Pat. No. 3,388,821. The hydraulic drive systems disclosed in the foregoing two patents do not, however, include a variable displacement pump operatively connected to a hydraulic motor, one pump and its associated motor serving the wheels on each side of the vehicle. The lack of variable displacement means for actuating the hydraulic motors in these prior art systems causes a substantial loss in efficiency when the vehicle is driven through a turn. When negotiating a turning movement, the wheels on one side must be driven at a velocity which varies from the velocity of the wheels on the opposite side. In the absence of the hydrostatic transmission, the necessary difference in velocity leads to inefficient power utilization in that engine power is required to brake one set of wheels while power is also required to accelerate the opposite set of wheels. Thus, to the extent that power input to one pair of wheels is necessary for braking, power is wasted. The present invention eliminates this lack of efficiency.

None of the prior art control linkages include means for varying or adjusting the effect upon wheel velocity of linkage input. In other words, a given input movement, in the prior art linkages (See, for example, White U.S. Pat. No. 3,388,821), results in a constant change in output or velocity. With the present invention, the relationship between linkage input and output may be adjusted to provide for safe, smooth operation.

The hydraulic drive systems of the prior art have also lacked the compact modular design of the present invention. The modular design of the present invention is made possible primarily by a unique transfer case which also promotes compactness and balance in component location.

SUMMARY

The present invention includes a vehicle body with an engine space at the rear end and forward space at the front end. The operator's seat is located in the forward space between the two ends and at an elevation above the engine space. The vehicle has two wheels on each side. A stanchion projects upwardly from adjacent the rear end of the body on each side of the engine space and a pair of lifting arms are pivotally mounted to the stanchion and extend forwardly and downwardly along each side of the operator's seat. A material handling member is pivotally mounted on the forward ends of the arms. Means is provided for raising and lowering the arms and for tilting the material handling member mounted thereto. Variable displacement hydrostatic means connects the engine with the wheels on each side of the vehicle to independently drive the wheels on one side with respect to the wheels on the opposite side, to thereby propel and maneuver the vehicle.

The invention also includes a unique linkage for varying the affect of operator control lever movement on vehicle speed and direction. More particularly, it includes means for varying the rate of change of swash plate position in the variable displacement hydrostatic means, per unit change in the position of the operator's control levers. The linkage includes a first link mounted for pivotal movement about a first axis in response to pivotal movement of one of the control arms, a second link mounted to the first link for pivotal movement about a second axis spaced from and parallel to the first axis, a third link mounted to the second link and extending transversely thereto for pivotal movement about a third axis parallel to and spaced from the second axis a distance equal to the distance from the first axis to the second axis, the third link being mounted for pivotal movement about a fourth axis spaced from and parallel to the third axis, and means for displacing the position of the first axis from a position coincident with the third axis to a position spaced from and parallel thereto.

The present invention also relates to a modular designed transmission system including a transfer case. The transfer case includes a housing, an input shaft, an output shaft spaced from and parallel to the input shaft, means for transferring rotational movement of the input shaft to the output shaft, means connecting the input shaft to the engine, means for connecting the opposite end of the input shaft to a hydrostatic transmission unit, and means for connecting the output shaft to a second hydrostatic transmission unit. Pumps for providing hydraulic fluid under pressure are powered off the opposite end of the transfer case output shaft. The modular construction of the present invention may be summarized as including a first module consisting of an engine, a second module consisting of a transfer case drivingly connected to the engine, a third and fourth module each consisting of a variable displacement hydrostatic transmission unit, each actuated by output from the transfer case, and a fifth and sixth module each consisting of gear reduction means operatively associated with each of the two hydrostatic transmission units.

The primary object of the present invention is to provide a front-end loader-type vehicle having a hydrostatic transmission for maximum power efficiency during turning and maximum smoothness and sensitivity in operation.

It is also an object to provide a vehicle of the type described above wherein the power system is modular in design.

It is also an object to provide a front-end loader-type vehicle having a hydrostatic transmission wherein the effect of operator input control lever movement upon wheel velocity and direction may be varied.

DESCRIPTION OF DRAWINGS

FIG. 2 is a partially broken away side view of the present invention and shows the loader arms in a lowered position, the engine and its mounting, and the modular transmission system components.

FIG. 3 shows the engine and its mounting, the modular transmission system components, the chain and sprocket wheel drive in one of the side compartments, and the fuel tank and hydraulic fluid reservoir (the latter in phantom).

FIG. 9 is a vertical sectional view of a wheel axle and shows the axle bearings, axle mounting sleeve, the wheel drive sprocket (located in the side compartments) and the rim mounting disc.

FIG. 10 is a side view of the adjustable idler sprocket which is a component of the chain and sprocket wheel drive system.

FIG. 11 is an end view of the idler sprocket shown in FIG. 10 and also shows the side compartment walls (the latter in section).

FIG. 14 is a sectional view of the gear reduction unit taken on the line 14—14 of FIG. 12.

FIG. 15 is a vertical sectional view of the left-hand steering box assembly taken immediately inside the exterior housing plate.

FIG. 16 is a sectional view taken on the line 16—16 of FIG. 15 and shows the left-hand steering box assembly including the adjusting shaft common to both the right-hand and left-hand steering box assembly. In FIG. 15 the steering box linkage is shown in a position which results in no movement of the output shaft per increment of movement of the operator's control lever.

FIG. 20 also shows schematically the relationship between the four valve spools and the operator's foot pedals. The symbols shown in FIG. 20 are conventional U.S.A.S.I. graphical symbols.

DESCRIPTION OF THE PREFERRED EMBODIMENT

General Description

Figure 1:
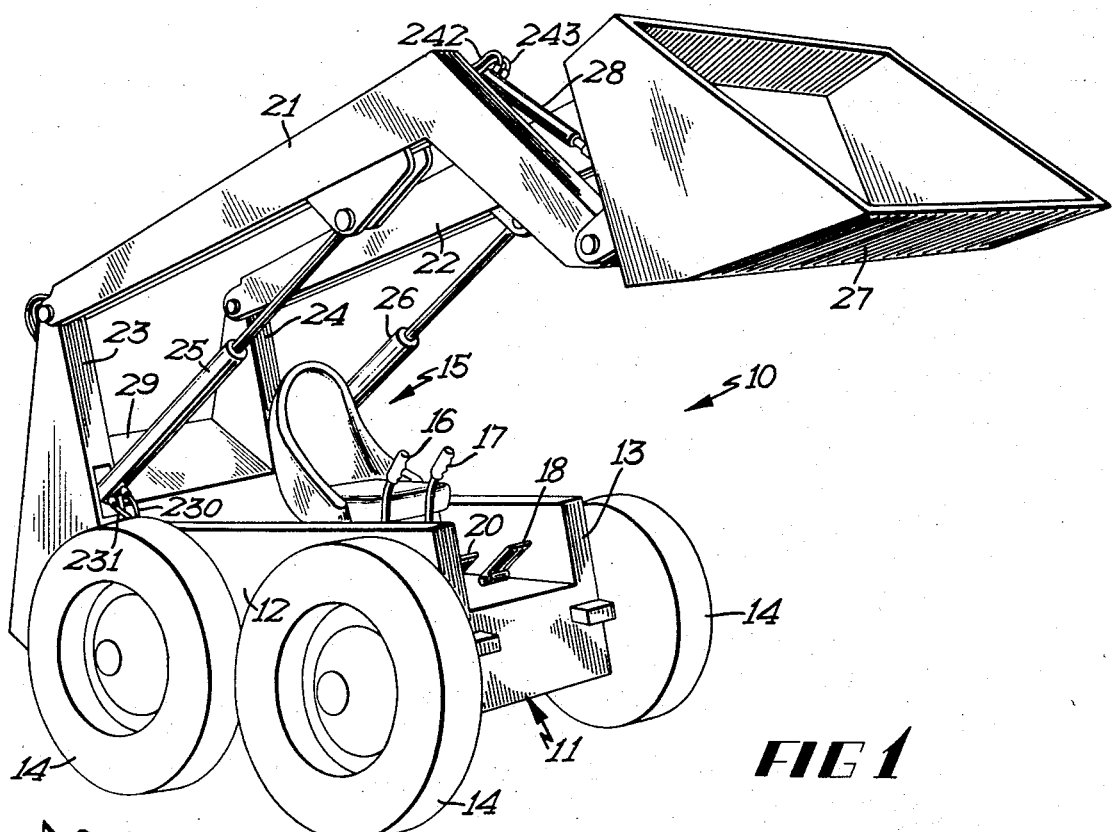
FIG. 1 is a perspective view of the loader which comprises the present invention and shows the loader arms in a raised position.
Figure 3:
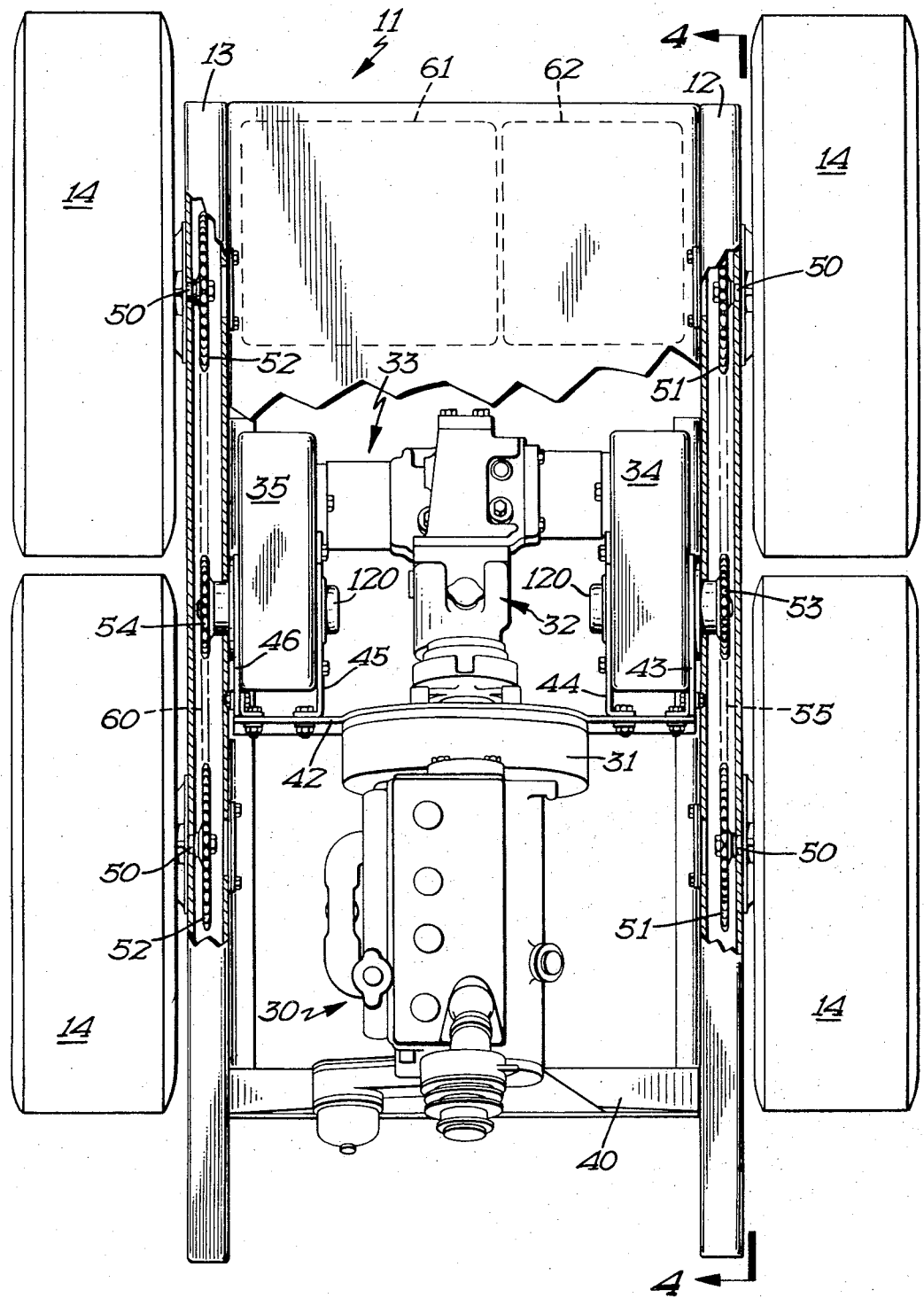
FIG. 3 is a top view with the seat, loader arms, and engine hood removed and with the side compartments partially broken away.

The present invention may be generally understood with reference primarily to FIGS. 1, 2 and 3. With reference to FIG. 1, the general elements of the invention 10 include a frame or body 11 which is characterized by two longitudinally extending side compartments 12 and 13. Vehicle 10 is mounted on wheels 14 and includes seat 15, operator hand control levers 16 and 17, and three foot pedal controls 18, 19 and 20, only two of which are shown in FIG. 1. (See FIG. 20 for the third foot pedal 20.) A pair of loader arms 21 and 22 are pivotally mounted to stanchions 23 and 24, respectively. Loader arms 21 and 22 are actuated by loader-arm lift cylinders 25 and 26. A material handling bucket 27 is pivotally connected to the forward lower ends of loader arms 21 and 22 and is actuated by bucket tilt cylinders 28, only one of which is shown in FIG. 1. An engine (See FIG. 2) is mounted under engine hood 29.

The general nature of the power transmission system may be understood with reference to FIGS. 2 and 3. The power transmission system is modular and includes the following modular units: engine 30; transfer case 31; a pair of hydrostatic transmissions 32 and 33, both drivingly connected to transfer case 31 and serving the right pair of wheels and left pair of wheels, respectively; and two gear reduction units 34 and 35 serving the right wheels and left wheels, respectively. The modular nature of the present invention is further derived from the means for mounting each of the modules. Thus engine 30 is mounted on bracket 40 which is in turn mounted on rail 41. Transfer case 31 and gear boxes 34 and 35 are mounted on transversely extending plate 42. Additional mounting brackets 43, 44, 45 and 46 are also provided to mount gear boxes 34 and 35 to transverse plate 42.

Figure 4:
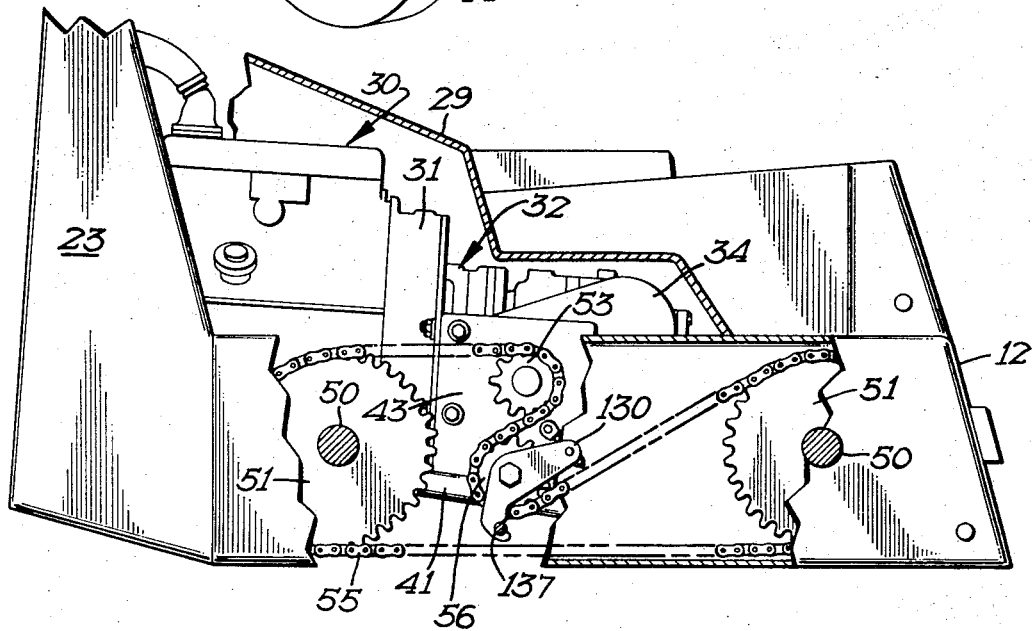
FIG. 4 is a sectional view taken on the line 4—4 of FIG. 3 and shows the chain and sprocket wheel drive system including the adjustable idler sprocket.

The general nature of the wheel-mounting and driving mechanism may be understood with reference to FIG. 3. Each of the wheels 14 is mounted on axle 50 which is keyed to wheel sprockets 51 and 52, each of which are located in side compartments 12 and 13, respectively. Drive sprocket 53 is also located in side compartment 12 and keyed to the output shaft of gear box 34. Drive sprocket 54 is located in side compartment 13 and is keyed to the output shaft of gear box 35. Chain 55 extends from drive sprocket 53, around idler sprocket 56 (see FIG. 4) and around wheel sprockets 51 to drive wheels 14 on the right side of vehicle 10, both in the same direction at the same speed. An identical chain 60 extends around drive sprocket 54, and an idler sprocket (not shown), and wheel sprockets 52 inside side compartment 13 to drive the wheels on the left side of vehicle 10, both in the same direction at the same speed.

A fuel tank 61 and hydraulic fluid reservoir 62 are located beneath the forward space and between side compartments 12 and 13 as shown in FIG. 3.

Figure 8:
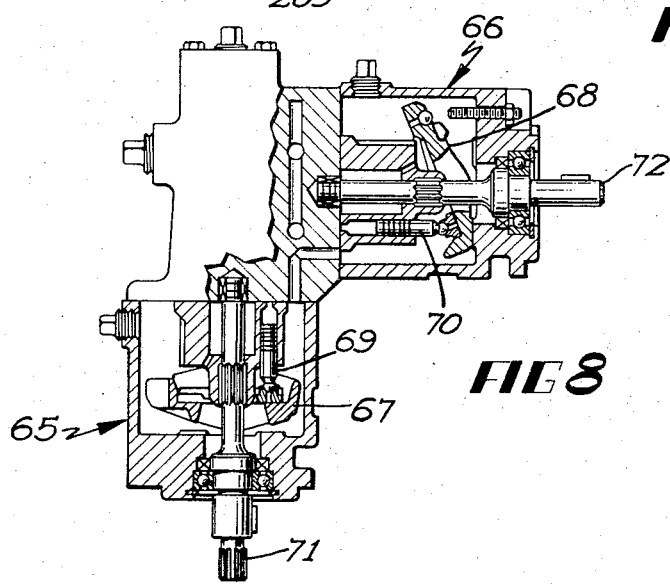
FIG. 8 is a somewhat schematic sectional view of a typical hydrostatic transmission unit used in the present invention. The transmission unit shown is of the swash plate and piston type and includes a variable displacement pump and a fixed displacement hydraulic motor.

As best understood with reference to FIG. 8, each of the hydrostatic transmission units 32 and 33 include a variable, positive-displacement pump 65 and operatively associated hydraulic motor 66, both of the revolving piston and swash plate type. Suitable transmission include model No. T-1515Y-2A manufactured and sold by Vickers Mobile Hydraulics Division of Sperry Rand Corporation, Troy, Michigan. Other conventional hydrostatic transmission units are suitable such as comparable models manufactured and sold by Sunstrand Corporation, Rockford, Ill. Such transmission units are conventional swash-plate type units which include, as shown schematically in FIG. 8, a swash plate 67 mounted for pivotal movement in pump 65 and a fixed swash plate 68 mounted in hydraulic motor portion 66. A series of revolving pistons 69 engage the face of swash plate 67 in the pump portion 65, and a series of revolving pistons 70 engage swash plate 68 in the hydraulic motor portion 66. Pistons 69 are caused to revolve by driving transmission input shaft 71 and the displacement of each piston per revolution may be adjusted by varying the plane of swash plate 67. It may be pointed out that the position of swash plate 67 shown in FIG. 8 is neutral, with no piston displacement per revolution. Reverse or forward displacement results when swash plate 67 is tilted. The output of pump unit 65 is directed to hydraulic motor portion 66 and the revolving piston 70 operates under pressure against tilted swash plate 68 to cause rotation of transmission output shaft 72, in forward or reverse direction.

Each of the transmission units 32 and 33 is controlled by operator control levers 16 and 17, respectively, through a linkage shown (and described in detail below) in FIGS. 15–19. Movement of levers 16 and 17, through the linkage shown in FIGS. 15–19, varies the plane of the swash plate 67 in the pump portion of the respective hydrostatic transmission unit to thereby vary the displacement per revolution of the revolving pistons in accordance with conventional hydrostatic transmission design. The variation in the displacement causes a change in speed and/or direction of the transmission unit output shaft 72, to thereby drive the vehicle in forward, reverse, or through a radius of curvature, at varying speeds.

Figure 5:
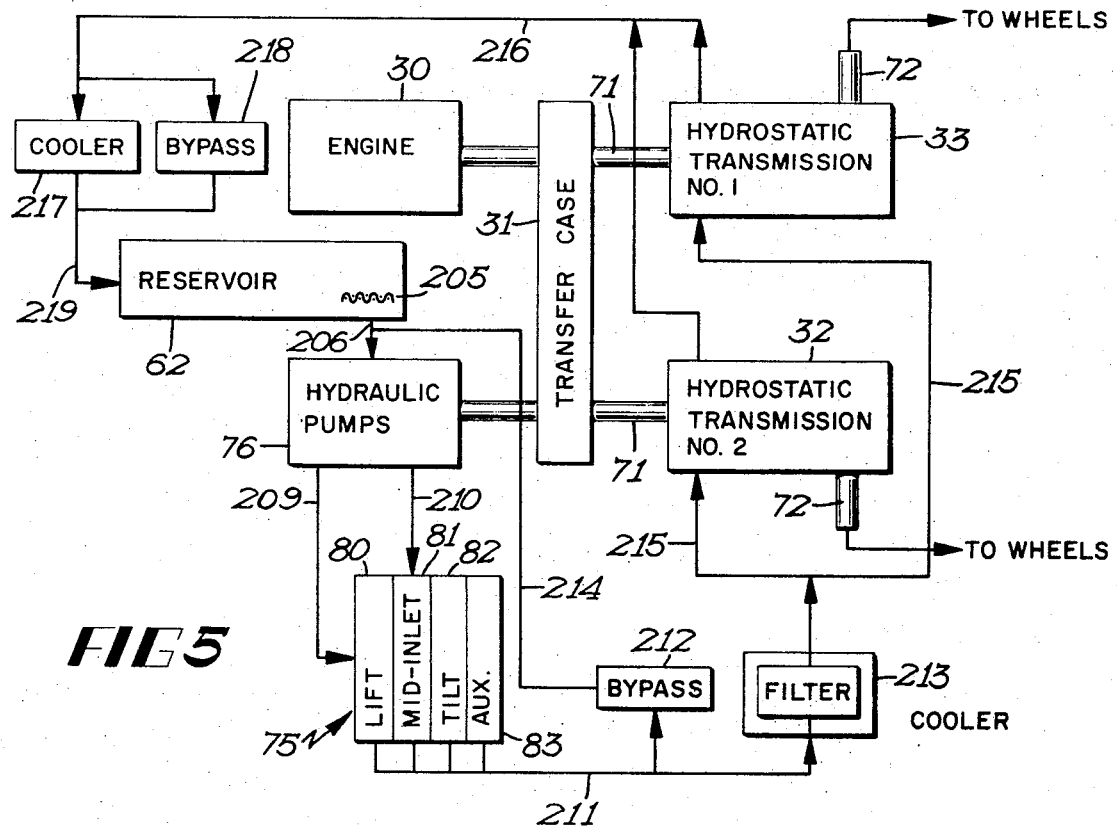
FIG. 5 is a hydraulic circuit diagram of a hydraulic circuit suitable for use within the present invention. It is particularly suitable for smaller capacity loaders.
Figure 6:
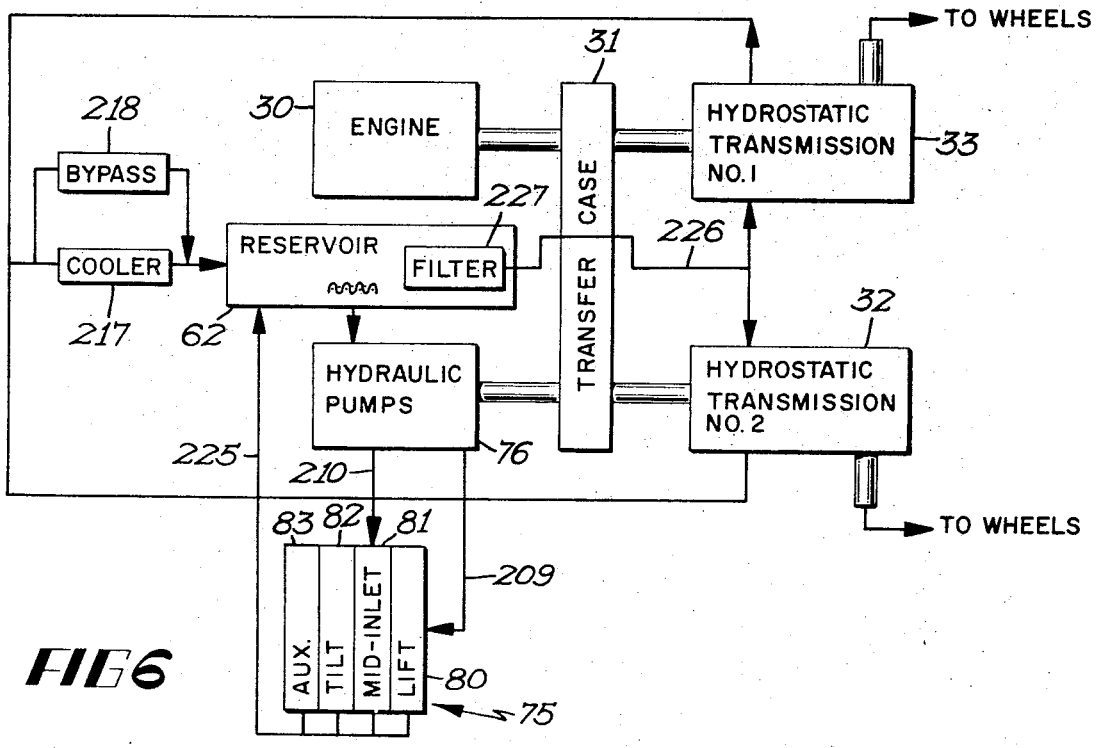
FIG. 6 is a hydraulic circuit diagram which also shows a hydraulic circuit suitable for use with the present invention. It is particularly suitable for larger capacity loaders.

The general hydraulic circuit for feeding the hydraulic transmissions 32 and 33 and for operating lift cylinders 25 and 26, tilt cylinders 28, and auxiliary attachments, may be understood with reference to FIGS. 5 and 6 which show two different suitable circuits. In both circuits valve bank 75 is provided with fluid under pressure by tandem operating hydraulic pumps 76, connected to an output shaft of transfer case 31. In each case hydraulic fluid is provided to hydraulic pump 76 from reservoir 62. Valve bank 75 includes four valve spools: a lift spool 80 for operating lift cylinders 25 and 26, mid-inlet spool 81 and tilt spool 82 for operating (fast and slow) bucket tilt cylinders 28, and an auxiliary spool 83 for operating auxiliary attachments (not shown). In the case of the circuit shown in FIG. 5, the output of the valve bank 75 is filtered and fed directly to hydrostatic transmission units 32 and 33. The circuit shown in FIG. 6 differs in that the output of valve bank 75 is fed back to reservoir 62 to constitute a separate hydraulic circuit for loader arm, bucket tilt, and auxiliary attachment operation. The circuit shown in FIG. 6, as a result of this difference, is particularly suitable for vehicles with a larger capacity, namely, vehicles with a lifting power of over 3,000 pounds and a rim pull (theoretical) of over 5,000 pounds.

General Operation

In general, the operation of the embodiment shown may be conveniently understood with reference primarily to FIGS. 1, 2 and 3. Engine 30 is connected to the input shaft of transfer case 31 which transfers rotative power to both hydrostatic transmission units 32 and 33 and hydraulic pumps (tandem) 76. The hydraulic pumps supply hydraulic fluid under pressure to valve bank 75, the output of which is fed to the hydrostatic transmission units 32 and 33 (FIG. 5) or back to reservoir 62 (FIG. 6). Hydraulic fluid is supplied to hydrostatic transmission units 32 and 33 from reservoir 62 (as well as from valve bank 75 in the embodiment shown in FIG. 5) to charge pump portions 65 in each transmission unit. Pumps 65, driven by power supplied through transfer case 31, supply fluid under pressure, when swash plate 67 is tilted out of the neutral position, to hydraulic motor units 66. Hydraulic motor unit 66 thus drives output shaft 72 which is drivingly connected to the input shaft of gear boxes 34 and 35. The output shaft of each of the gear boxes rotates drive sprocket 53 in side compartment 12 and drive sprocket 54 in side compartment 13. Chains 55 and 60 in side compartments 12 and 13, respectively, drivingly connect drive sprockets 53 and 54 with wheel sprockets 51 and 52 respectively. Thus rotation of drive sprockets 53 and 54 causes rotation of wheel sprockets 51 and 52, respectively, to thereby drive the wheels 14 on each side of the vehicle 10. The wheels on one side of vehicle 10 are independently driven as to direction and speed with respect to the wheels on the other side and, due to the chain and sprocket drive, both wheels on one side are driven in the same direction at the same speed.

Vehicle 10 may be steered, pivoted, reversed, and accelerated through the operation of control levers 16 and 17 and their associated linkages, described in detail below, and shown in FIGS. 15–19. Independent movement of operator control levers 16 and 17 independently varies the position of swash plate 67 in the pump portion of hydrostatic transmission units 32 and 33, respectively, to thereby vary the output of hydraulic motor 66 in direction and in speed. Thus as operating levers 16 and 17 are tilted forward and back, output shaft 72 of hydrostatic transmission units 32 and 33, respectively, is caused to rotate in forward and reverse directions and at varying speeds, due to the change in the output of pump portion 65 of each transmission unit. Drive sprockets 53 and 54 are consequently driven in forward and reverse directions and at varying speeds to independently drive wheels 14 on one side of vehicle 10 with respect to wheels 14 on the other side of vehicle 10. Variation in the position of swash plate 67 thus serves vehicle 10 at varying speeds forward, at varying speeds in reverse, through a pivotal movement (with the wheels on opposite sides of vehicle 10 being driven at the same rate in opposite directions) or through a forward or reverse radius of curvature (with the wheels on one side being driven in the same direction as the wheels on the other side but at a different rate). The hydrostatic transmission system described thus provides a highly sensitive means for varying the power applied to wheels 14. The foregoing design also results in a smoothly operating transmission system that is highly sensitive.

Hydraulic fluid supplied to valve bank 75 is directed to actuate loader arms 21 and 22, bucket 27 or the auxiliary attachment (not shown) by operator manipulation of foot pedals 18, 19 and 20, respectively. Foot pedals 18, 19 and 20 vary the position in valve spools 80, 81, 82 and 83 shown in FIG. 20, and described more particularly below, to selectively provide fluid to double acting loader arm cylinders 25 and 26, double acting tilt cylinders 28, and an auxiliary attachment (not shown).

Another feature of the general operation of the present invention resides in its modular design. If a malfunction occurs or if a general overhaul of certain parts is desirable, a modular unit may be simply and conveniently removed without disassembly of associated modular units to make repair or replacement highly convenient.

Detailed Description

With the foregoing general description of the construction and operation of the present invention the following detailed description may be readily understood. In keeping with the modular construction described above, each of the modular units will be described separately in detail.

Engine 30 may be a four-cylinder, water-cooled, 32 horsepower (at 2,800 r.p.m.) Model Y112 engine manufactured by Continental Motors Corporation, Detroit. Michigan. Other similar engines are also, of course, suitable and diesel engines and electrical motors are also suitable.

Figure 7:
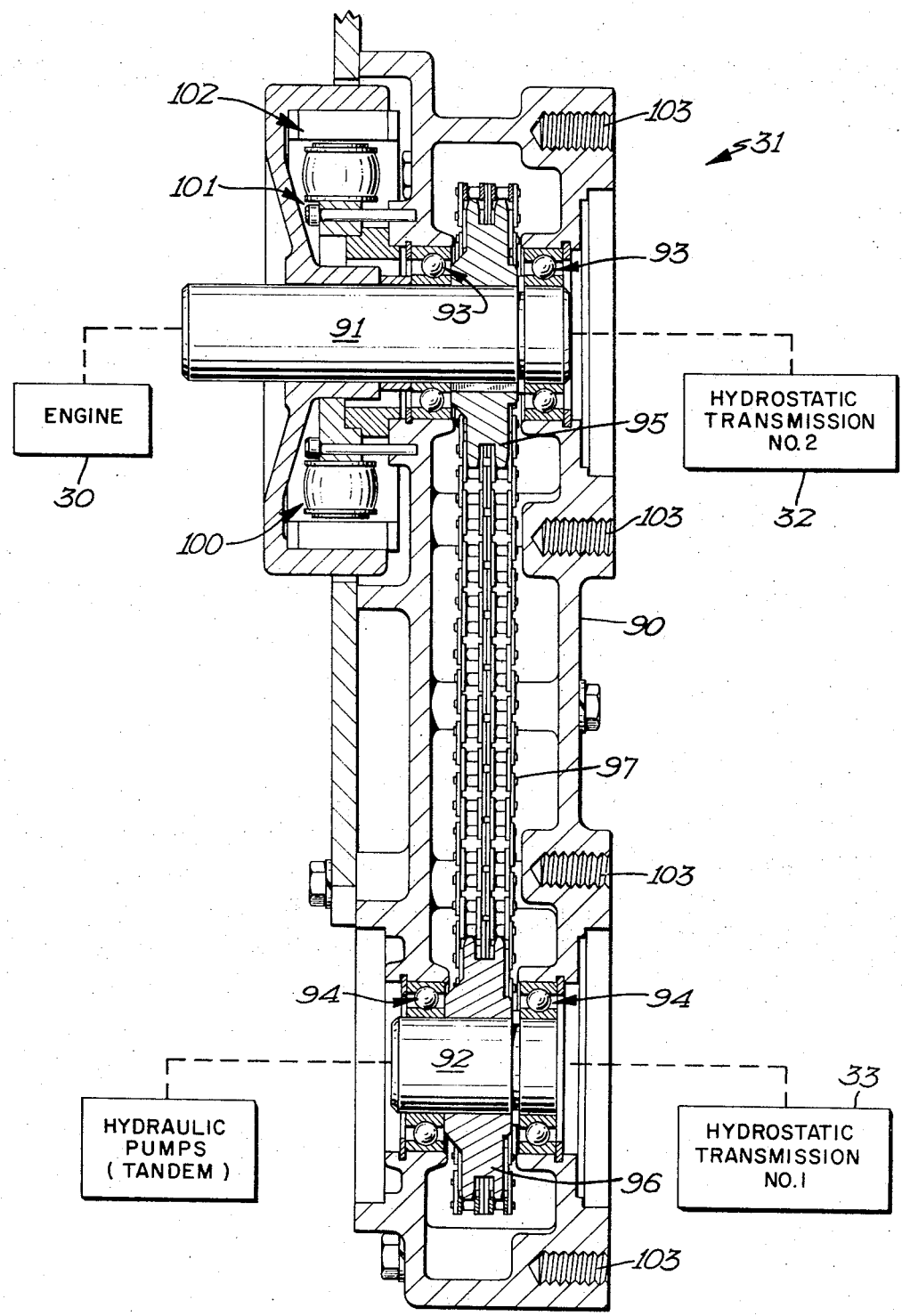
FIG. 7 is a vertical sectional view of the transfer case which serves as a modular component of the transmission system and shows an alternator mounted to the input shaft of the transfer case. The relationship between the transfer case and the engine and transmission units is shown schematically in FIG. 7.

Transfer case 31 shown in FIG. 7, includes housing 90, which serves to mount input shaft 91 and output shaft 92 in spaced parallel relationship in bearings 93 and 94, respectively. Double input sprocket 95 is keyed to input shaft 91. Double output sprocket 96 is keyed to output shaft 92 and a pair of chains 97 drivingly connect sprocket 95 with sprocket 96. Both input shaft 91 and output shaft 92 are internally splined to provide for coupling with various modular components. The output shaft of engine 30 is externally splined to one end of input shaft 91, as shown schematically in FIG. 7, and the input shaft of hydrostatic transmission unit 32 is internally splined to the opposite end of input shaft 91. Similarly, the input shaft of hydrostatic transmission unit 33 is internally splined to one end of output shaft 72 while the hydraulic pumps (operated in tandem) are internally splined to the opposite end of output shaft 92, also shown schematically in FIG. 7. Both sprockets 95 and 96 contain a similar number of teeth and, consequently, output shaft 92 is caused to rotate at the same speed as input shaft 91.

Alternator 100 may be operatively associated with transfer case input shaft 91, as shown in FIG. 7, as an efficient means of generating electric power for battery charging, operation of lights and other instruments which require electricity on the vehicle. Alternator 100 may be of any conventional design. The stator 101 is mounted to housing 90 and the rotor 102 is keyed to input shaft 91 for actuation thereby.

Housing 90 of transfer case 31 serves as a container for oil which continuously lubricates chains 97 and sprockets 95 and 96 as chains 97 operate in an oil bath.

Housing 90 of transfer case 31 is tapped at four points 103 which serve, in the modular construction of the present invention, as means for mounting hydrostatic transmission units 32 and 33.

Hydrostatic transmission units 32 and 33 are shown generally in FIG. 8 and have been described above in general terms. It may be pointed out, however, that the form of the transmission unit available from suppliers, particularly those suppliers referred to above, includes elements not required in the present application of the unit. More particularly, while the conventional hydrostatic transmission units are supplied with a variable displacement motor and external means for tilting the motor swash plate 68, the present application of the transmission unit does not require a variable displacement motor and consequently swash plate 68 is fixed. In addition, a charging pump is supplied as a part of the conventional hydrostatic transmission unit. The charging pump is not necessary with smaller capacity loaders when the transmission unit is used in hydraulic circuit corresponding to FIG. 5. The charging pump is, however, customarily utilized in larger capacity applications such as in the hydraulic circuit shown in FIG. 6.

Figures 12, 13:
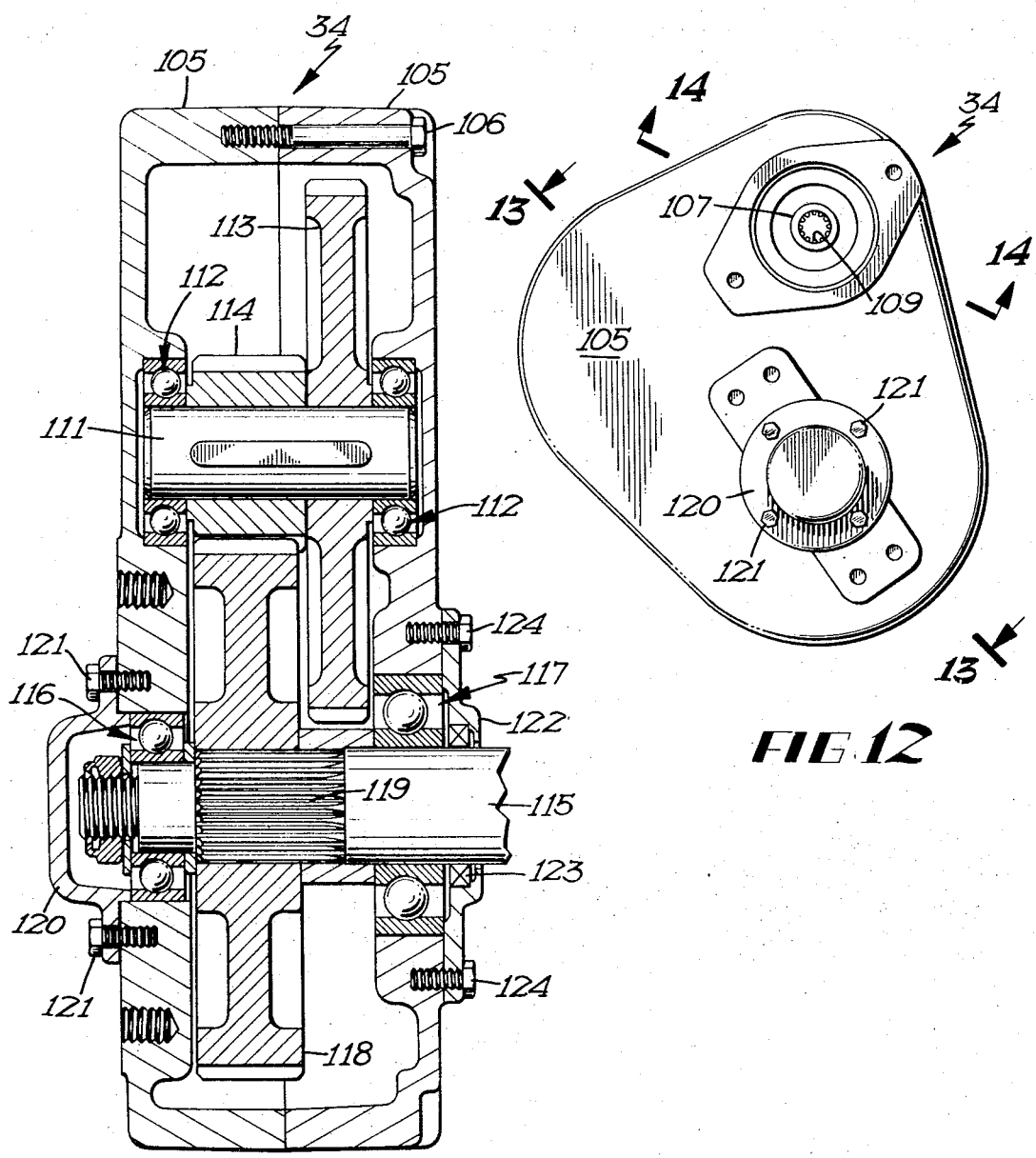
FIG. 12 is a side view of the modular gear reduction unit.
FIG. 13 is a sectional view of the gear reduction unit taken on the line 13—13 of FIG. 12.
Figure 18:
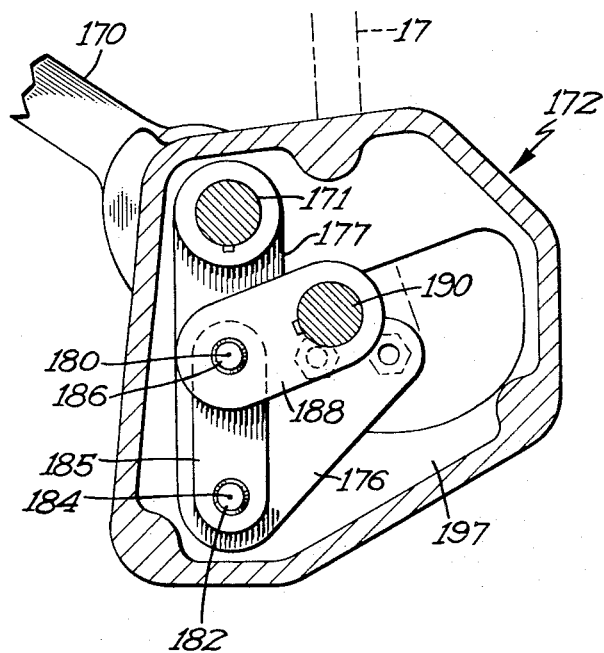
FIG. 18 is a vertical sectional view taken on the line 18—18 of FIG. 16 and shows the left-hand steering box assembly linkage.

Gear boxes 34 and 35, which are identical, are shown in FIGS. 12, 13 and 14. Gear box 34 includes a split housing 105, the two halves of which are joined by means of bolts 106. Housing 105 serves to mount input shaft 107, best seen in FIGS. 12, and 14, on bearings 108. Input shaft 107 is internally splined at 109 and includes gear teeth 110 formed integrally therewith.

Housing 105 also serves to mount transfer shaft 111 in bearings 112, best seen in FIG. 13. Transfer shaft 111 has a large gear 113 and a small gear 114, each keyed thereto. Large gear 113 is meshed with gear 110 of input shaft 107.

Housing 105 of gear box 34 also serves as a means for mounting output shaft 115 best seen in FIG. 13, in bearings 116 and 117. Gear 118 is spline mounted to ouput shaft 115 at spline 119 and meshes with gear 114 of transfer shaft 111. Bearing 116 is accessible by removal of cap 120 secured to housing 105 by means of bolts 121. Bearing 117 is also accessible by removal of collar 122 and its associated packing or seal 123 by removal of bolts 124.

The foregoing design of gear box 34 provides substantial gear reduction from input shaft 107 to output shaft 115. Input shaft 107 through its internal spline 109 is connected with output shaft 72 of hydrostatic transmission unit 32. Output shaft 115 of gear box 34 is keyed to drive sprocket 53 and 54, respectively. The chain and sprocket power transfer means for driving wheels 14 on each side of vehicle 10 has been referred to above in general terms and may be best seen with reference to FIGS. 3, 4, 10 and 11. The chain and sprocket drive system is identical on each side of vehicle 10. With respect to the drive system on the right hand side of the vehicle located in side compartment 12, chain 55 passes over drive sprocket 53, wheel sprockets 51, and idler sprocket 56, best seen in FIG. 4. Wheel sprockets 51 are keyed to axles 50 and, consequently, rotation of drive sprocket 53 drives axles 50 in the same direction at the same speed.

Idler sprocket 56 is adjustable as best shown in FIGS. 10 and 11. For that purpose sprocket 56 is mounted between a pair of spaced hooked mounting plates 130 on pin 131. A second pin 132 extends through the spaced hooked mounting plates 130, as best seen in FIG. 11, and serves as a means for pivotally connecting threaded rod 133 to pin 132 through collar 134 shown in FIG. 11. Threaded rod 133 is pivotally connected to pin 135, which extends the distance between the inside and the outside plate of side compartment 12, through collar 136.

Pin 137 also extends the distance between the inside and outside plates of side compartment 12 and is engaged by the hook portion of spaced hooked mounting plates 130, as shown in both FIGS. 10 and 11.

A pair of bolts 140 serve as a means, in association with collar 134, for arcuately adjusting the position of sprocket 56 with respect to the axis of pin 137. Thus idler sprocket 56 can be adjusted to vary the tension in chain 55.

It should be pointed out that chain 55 runs continuously in an oil bath in side compartment 12 to thereby provide continuous lubrication of drive sprocket 53, wheel sprockets 51, and idler sprocket 56.

Each of the wheels 14 is mounted to its respective axle 50, and axle 50 is in turn mounted to side compartment 12 or 13 and wheel sprocket 50 or 51 as shown in FIG. 9. Each axle 50 is mounted in flanged wheel mounting sleeve 150 on tapered roller bearings 151. Bearings 151 are sealed in flanged wheel mounting sleeve 150 by means of retaining rings 152 which also serve to mount rubber sealing ring 153 as shown in FIG. 9.

Sprocket 51 is keyed to shaft 50 at the tapered end thereof by means of key 154 and held in place by means of bolt 155. The opposite end of shaft 50 is provided with an integrally formed wheel mounting disc 156 which has a series of threaded wheel mounting studs 157 welded thereto. Axle 50 is rotatable mounted to side compartment 12 with sprocket 51 in side compartment 12 by means of bolts 160 and threaded rod members 161, the latter being welded to side compartment 12. Sprocket 51, as referred to above, operates in a continuous oil bath which may be readily seen with reference to FIG. 9.

Figure 17:
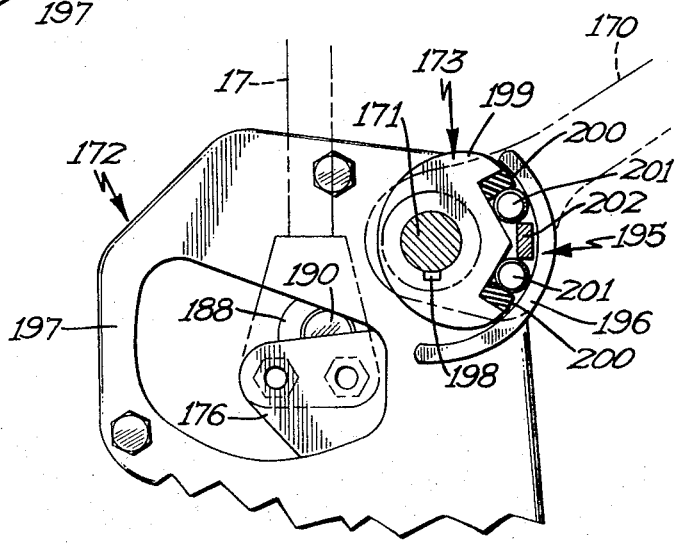
FIG. 17 is a vertical sectional view taken on the line 17—17 of FIG. 16 and shows the non-reversing shaft clutch and the relationship between the operator's control lever (left hand) and the clutch.

The swash plate control linkage for connecting operating levers 16 and 17 with the swash plates 67 of hydrostatic transmission units 32 and 33, respectively, is shown in FIGS. 15-19. Only the left steering box linkage assembly is shown in the foregoing figures, it being understood that the right side steering box linkage assembly is a mirror image of the left side. With reference first to FIG. 17, the swash plate control linkage includes operator control lever 17 and linkage control lever 170. Movement of linkage control lever 170 varies the effect of movement of operating levers 16 and 17 upon their associated linkages and the respective swash plates. For that purpose a common linkage common shaft 171, best seen in FIG. 16, extends from steering box assembly 172 on the left side of vehicle 10 to the corresponding steering box assembly on the other side. Common shaft 171 is pivoted about its axis and held in position by means of lever 170 and non-reversing clutch assembly 173, respectively, best seen in FIG. 17. Thus by varying the position of control lever 170, through a linkage described in detail below, the pivotal axis of operator control lever 17 may be varied to thereby vary the effect of movement of lever 17 on swash plate 67. This variation may be adjusted through a range of no swash plate movement per increment of movement of operator control levers 16 and 17 (shown in FIG. 15), to maximum swash plate movement per increment of movement of operator control levers 16 and 17 (shown in FIG. 19).

This adjustability is brought about by varying the position of the pivotal axis 175 of first triangular link 176, best seen with reference to FIGS. 15 and 16. For the purpose of varying or displacing the position of first axis 175, a link 177 is keyed to common shaft 171 by means of key 178 and is secured to pin 179, the axis of which constitutes first axis 175. Together control arm 170, control rod 171, link 177, and pin 179 together constitute means for incrementally displacing the position of first axis 175 from a position coincident with third axis 180 (described more particularly below), to a position spaced from and parallel thereto.

First link 176 is pivotally secured to pin 179 by means of bushing 181. First link 176 is generally triangular in configuration and control arm 17 is mounted thereto as best seen in FIG. 17. A second pin 182 is pivotally secured to first link 176 by means of bushing 183. The axis of pin 182 defines second axis 184.

Second link 185 is secured to pin 182 and to pin 186. The axis of pin 186 defines third axis 180.

Third link 188 is pivotally secured to pin 186 by means of bushing 189 and is keyed to rod 190, the axis of which defines fourth axis 191. A final link 192 is keyed to rod 190 and is connected by conventional linkage (not shown) to swash plate 67 to thereby tilt swash plate 67 with pivotal movement of final link 192 about fourth axis 191.

With the linkage shown in the position of FIGS. 15 and 16, movement of operator control lever 17 results in no movement of final link 192. Thus maximum movement of operator control lever 17 has no effect on the position of swash plate 67. This is true because first axis 175 is coincident with third axis 180 so that pivotal movement of first link 176 about first axis 175 does not effect the position of third axis 180.

Figure 19:
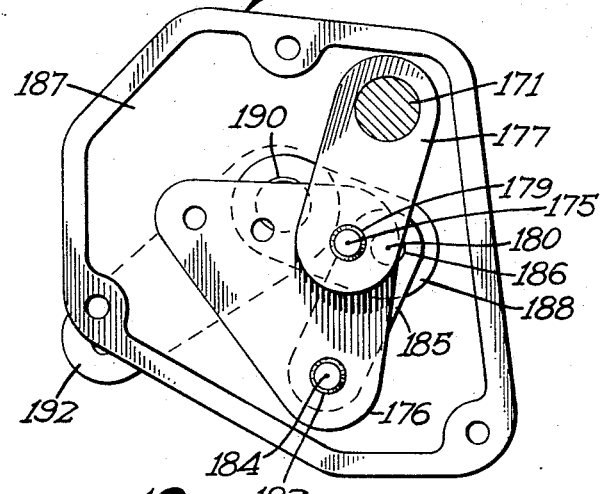
FIG. 19 is a vertical sectional view of the left-hand steering box assembly comparable to FIG. 15 but with the steering box linkage in a position which produces maximum movement of the output shaft per increment of movement of the operator's control lever.

With the linkage shown in the position of FIG. 19, however, movement of control arm 17 does effect the position of swash plate 67. In FIG. 19, first axis 175 is displaced a distance to the left of third axis 180 by means of pivotal movement of linkage adjusting lever 170, common rod 171, and link 177. Consequently, pivotal movement of first link 176 about first axis 175 results in arcuate movement of third axis 180 about axis 175, as second axis 184 moves arcuately about first axis 175, to thereby cause arcuate movement of third axis 180 through second link 185. This arcuate movement of third axis 180 causes pivotal movement of third link 188 and rod 190 about fourth axis 191 since third link 188 is keyed to rod 190. Final link 192, keyed to rod 190 also pivots about fourth axis 191.

The linkage shown in FIGS. 15-19 may be set in other positions within the range of adjustment represented by FIG. 15 to FIG. 19 to thereby vary the degree of displacement of first axis 175 with respect to third axis 180 to in turn, vary the effect on swash plate 67 of movement of operator control levers 16 and 17. This variation, which is brought about in both the right-hand and left-hand steering box linkage assembly by common shaft 171 is accomplished by movement of linkage adjusting lever 170. Movement of linkage adjusting lever 170 pivots common rod 171 about its axis to thereby pivot link 177 in both the right-hand and left-hand steering box linkage assembly. Pivotal movement of link 177 displaces first axis 175 from third axis 180 in both boxes.

Once linkage adjusting lever 170 is moved, it is held in position by non-reversing shaft clutch 195, shown in FIG. 17. Non-reversing shaft clutch 195 includes an arcuate fixed clutch plate 196 which is formed integrally with side plate 197 of steering box linkage assembly 172. Linkage adjusting lever 170 is keyed to a common shaft 171 by means of key 198. Clutch housing 199, best seen in FIG. 17 is also keyed to common shaft 171. Thus movement of linkage adjusting lever 170 results in pivotal movement of common shaft 171 and clutch housing 199.

Clutch housing 199 serves to mount movable clutch members consisting of rubber blocks 200 and metal cylindrical element 201. Cylindrical elements 201 engage clutch housing 199, rubber blocks 200, and clutch plate 196 and are separated by stud 202 which is welded to and cantilevered from linkage adjusting lever 170.

Non-reversing clutch 195 serves to allow pivotal movement of common shaft 171 when linkage adjusting lever 170 is actuated, and to prevent reverse movement of common shaft 171 which would otherwise occur due to pressure on swash plate 67 transferred to linkage adjusting lever 171 through a conventional linkage (not shown), final link 192, and the linkage shown in FIG. 16. Reverse movement is prevented by the wedging action of cylindrical elements 201 against rubber blocks 200, clutch housing 199, clutch plate 196, and stud 202. Any tendency to move common shaft 171 and clutch housing 199 keyed thereto, merely results in increased wedging between cylindrical elements 202 and clutch plate 196 to thereby further secure both clutch housing 199 and common rod 171 keyed thereto against pivotal movement. If, however, a force is applied by movement of linkage adjusting lever 170, stud 202 engages cylindrical element 201 with its leading edge and depresses element 202 to eliminate wedging against clutch plate 196 and allow movement of clutch housing 199 with respect to clutch plate 196. The trailing cylindrical element 201 merely rides between clutch housing 199 and clutch plate 196 with no wedging action in response to pushing by the trailing rubber block 200.

Two typical hydrostatic circuits are the relationship between the elements in the hydrostatic circuit and the engine 30 and transfer case 31 are shown in FIGS. 5 and 6. As pointed out above, the circuit shown in FIG. 5 is particularly suitable for small capacity loaders while the circuit shown in FIG. 6 is suitable for high capacity loaders. With reference first to FIG. 5, hydraulic fluid reservoir 62 includes screen 205. Conduits 206 and 207 conduct screened hydraulic fluid from reservoir 62. Conduit 206 feeds hydraulic pumps 76, which operate in tandem, and the output of one pump is conducted to lift spool 80 by means of conduit 209, and the output of the other pump is conducted to mid-inlet spool 81 by conduit 210. Tilt spool 82 is fed by the internal output of mid-inlet spool 81. (See FIG. 20) Auxiliary spool 82 is fed by the internal output of tilt spool 82, all as described more particularly below in connection with FIG. 20. A common drain conduit 211 connects with each of the valve spools in valve bank 75 to conduct hydraulic fluid to by-pass 212 and filter 213. Fluid conducted through by-pass 212 returns to conduit 206 through return line 214.

In the absence of fluid passage through by-pass 212, fluid in conduit 211 passes through filter 213 through conduit 215 to supply fluid to the variable displacement pump and hydraulic motor in transmission units 32 and 33. A common return line 216 conducts spent hydraulic fluid from hydrostatic transmissions 32 and 33 to cooler 217 and by-pass 218 for return by means of conduit 219 to reservoir 62.

With reference to FIG. 6, components which are identical to those described in FIG. 5 have the same reference numerals. The difference between the two circuits is that the valve bank return conduit 225 shown in FIG. 6 differs from valve bank conduit 211 of FIG. 5 in that return conduit 225 leads directly back to reservoir 62 and does not feed either of the hydrostatic transmission units and does not travel a by-pass conduit prior to reaching reservoir 62. Thus by-pass 212 is eliminated. Conduit 226 conducts fluid directly from reservoir 62 through filter 227 to hydrostatic transmission units 32 and 33 and in this sense distinguishes from the circuit of FIG. 5. In this sense there are two separate hydraulic circuits in FIG. 6, one for operating the transmission units and the other for operating the loader arms, tilt cylinder, and auxiliary attachments. In other respects the circuits are the same.

Tandem operated hydraulic pump 76 may be of the vane type and have an individual flow rate of up to 9⅓ GPM at a pressure up to 1,650 PSIG. Filter 227 mounted for convenience in reservoir 62 (See FIG. 6) is preferably a ten micron filter. Filter 213 in FIG. 5 is preferably a twenty-five micron full flow filter. By-pass 212 in the case of FIG. 5 serves as a pressure regulating valve and allows by-pass of hydraulic fluid when pressure in conduit 211 exceeds 25 to 150 PSI.

Figure 20:
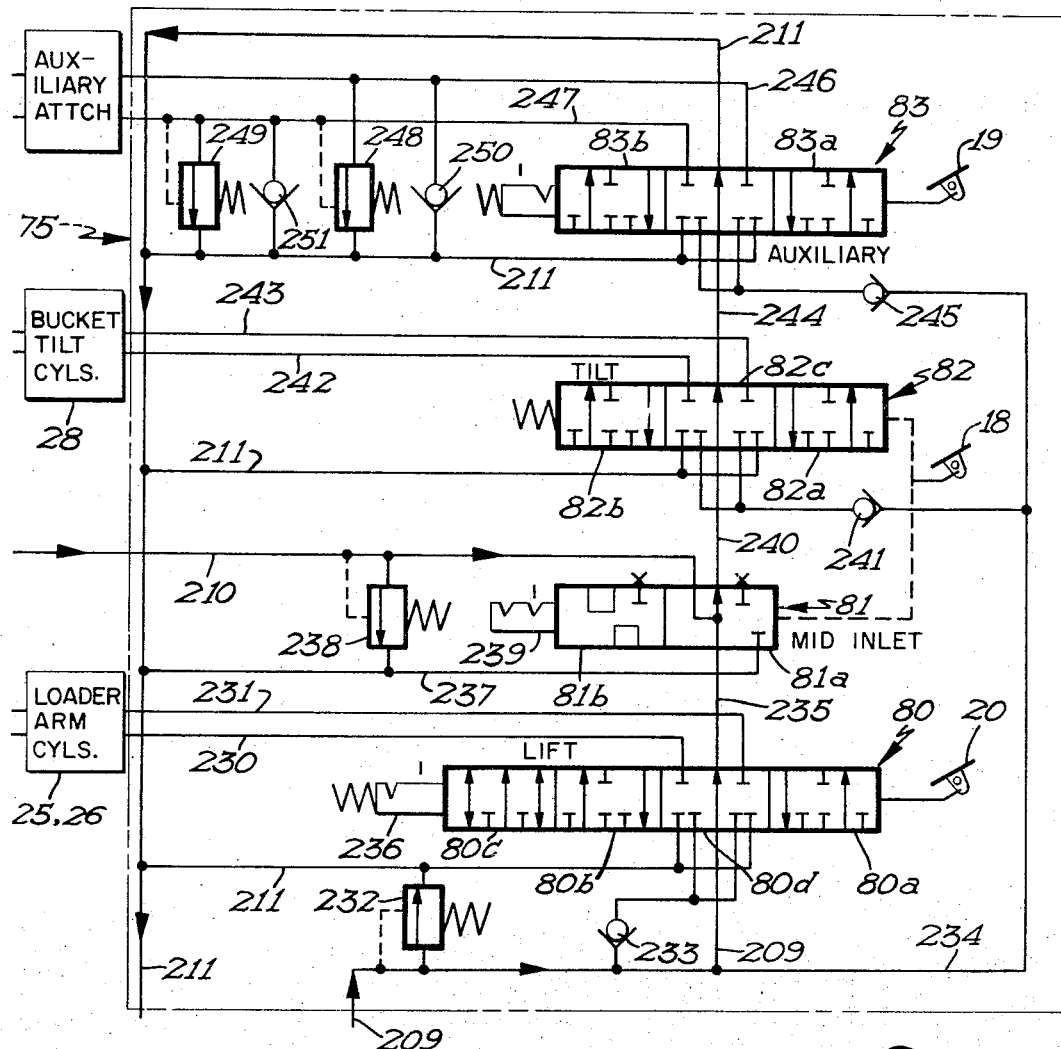
FIG. 20 is a schematic hydraulic circuit diagram of the valve bank for controlling the lift cylinders, the bucket tilt (fast and normal) cylinders and the auxiliary attachments.

The hydraulic circuit through valve bank 75 is shown in FIG. 20. Each of the four valve spools, namely, lift spool 80, mid-inlet spool 81, tilt spool 82 and auxiliary spool 83, are schematically shown for each of their respective positions. Lift spool 80 has four positions, mid-inlet spool 81, two positions; tilt spool 82, three positions; and auxiliary spool 83, three positions. In FIG. 20, each of the valve spools is shown in its neutral or "straight-through" position. Conduit 209, shown in FIG. 5, serves as an input conduit for lift spool 80. Conduit 210, also shown in FIG. 5, serves as input conduit for mid-inlet spool 81. A common drain line 211, leads from each of the valve spools to by-pass 212 and filter-cooler 213. In the circuit shown in FIG. 6 this common drain conduit is designated as conduit 225.

Lift spool 80 operates loader arm cylinders 25 and 26 through conduits 230 and 231 and is fed by input conduit 209. A pilot operated relief valve 232 (set at about 1,650 PSI) connects input conduit 209 directly with drain conduit 211. Check valve 233 allows one-way movement of hydraulic fluid to valve spool 80 and a by-pass line 234 is also provided. In the position shown in FIG. 20, valve spool 80 directs no fluid through conduits 230 and 231 and loader arm cylinders 25 and 26 are blocked. In position 80a, loader arm cylinders 25 and 26 are extended with no drain through conduit 235 to mid-inlet spool 81. In position 80b loader arm cylinders 25 and 26 are retracted with, similarly, no drain to mid-inlet spool 81. In position 80c valve spool 80 connects conduits 230 and 231, with no drain through conduit 235, to mid-inlet spool 81 to thereby allow free movement of loader arms 21. In position 80d shown in FIG. 20 conduits 230 and 231 are blocked to hold loader arms 21 and 22 in a given position, with drain to mid-inlet spool 81 through conduit 235. Detent 236 serves to lock valve spool 80 in position 80c to provide for "free-floating" of loader arms 21 and 22 during movement, for example, of bucket 27 over an irregular surface.

Mid-inlet spool 81 is used for fast and slow bucket tilt. Input conduit 210 described previously feeds mid-inlet spool 81 and is directly connected to mid-inlet drain 237 through normally closed pilot relief valve 238. Detent 239 serves to hold mid-inlet spool 81 in position 81a (fast tilt) or 81b (slow tilt). In position 81a (fast tilt) hydraulic fluid in conduit 210 is directed to tilt spool 82 while in position 81b (slow tilt) tilt spool 82 is isolated from hydraulic fluid in conduit 210 which is channeled to mid-inlet spool drain line 237.

Tilt spool 82 receives its input through conduit 240 from input conduit 210, when mid-inlet spool 81 is in position 81a, and also from by-pass conduit 234 through check valve 241. With tilt spool 82 in position 82a bucket tilt cylinders 28 are actuated through conduits 242 and 243, to tilt bucket 27 in one direction. With tilt spool 82 in position 82b, fluid flow is reversed in conduits 242 and 243 to tilt bucket 27 in the opposite direction. In position 82c hydraulic fluid input is channeled directly to auxiliary spool 83 through conduit 244.

Auxiliary spool 83 is provided with two drain conduits which are served by two branches of drain line 211 and is supplied by hydraulic fluid through conduit 244 from tilt spool 82 or from by-pass conduit 234 through check valve 245. Auxiliary attachment actuating conduits 246 and 247 are provided with fluid under pressure when auxiliary spool 83 is in position 83a and 83b to thereby actuate the attachment, whatever it may be. Both conduits 246 and 247 are directly connected to drain conduit 211 through normally closed pilot relief valves 248 and 249 respectively. Check valves 250 and 251 connect drain 211 to auxiliary attachment actuating conduits 246 and 247 respectively.

Lift spool 80 is operated by means of foot pedal 20 for setting in positions 80a – 80d by a conventional linkage (not shown). Position 80d is automatically assumed in the absence of pressure on foot pedal 20 and setting of detent 236.

Mid-inlet spool 81 is set by foot pedal 18. Tilt cylinder 82 is also set by means of foot pedal 18 and automatically returns to position 82c in the absence of foot pressure. By a conventional linkage (not shown) foot pedal 18 actuates both tilt spool 82 and mid-inlet spool 81 with a mechanical advantage in actuating tilt spool 82 as compared to mid-inlet spool 81. Thus initial movement of foot pedal 18 will first actuate tilt spool 82 and then actuate mid-inlet spool 81 to thereby give the operator the use of both slow and fast bucket tilt.

Auxiliary spool 83 is similar to tilt spool 82 and is set in position 83a and 83b by means of foot pedal 19. Detent 252 is also provided to hold valve spool 83 in a given position for steady operation of a particular attachment such as a post-hole auger.

Detailed Operation

The vehicle described above is steered, and controlled with respect to speed, through manipulation of operator control levers 16 and 17. Forward movement of both levers results in straight forward movement of vehicle 10. Rearward movement of both levers results in straight rearward movement. By pushing operator control lever 16 (right) forward to its forward limit and by pushing operator control lever 17 (left) slightly forward vehicle 10 will turn through a radius of curvature to the left. By pushing operator control lever 16 (right) forward while operator control lever 17 (left) is pulled back, vehicle 10 may be caused to pivot to the left about its own vertical axis.

Hydrostatic transmission units 32 and 33 are controlled by the foregoing operation of operator control levers 16 and 17 through the linkage shown in FIGS. 15–19 and a conventional linkage (not shown) from final link 192 (see FIGS. 15 and 16) to swash plate 67 of the respective hydrostatic transmission unit. The rate of movement of final link 192 and, as a result, the rate of tilting of swash plate 67 may be adjusted by changing the position of linkage adjusting lever 170. Movement of linkage adjusting lever 170 results in a displacement between first axis 175 and third axis 180, the degree of which effects the amount of movement of final link 192 in response to movement of operator control levers 16 and 17. Thus, the responsiveness of the vehicle to manipulation of operator control levers 16 and 17 can be adjusted. When operating in rough terrain, or when operating with an inexperienced operator, linkage adjusting lever 170 may be set to provide a small displacement between first axis 175 and third axis 180 to thereby minimize the change in swash plate positions per increment of movement of operator control levers 16 and 17. Thus, shifting from forward to reverse does not result in a quick change of direction and, moreover, the upper limit of speed in both the forward and reverse directions is decreased. On smooth sandy ground with an experienced operator, linkage adjusting lever 170 may be set to cause maximum displacement between first axis 175 and third axis 180, as shown in FIG. 19, to, in turn, provide maximum tilting of swash plate 67 per increment of movement of operator control levers 16 and 17. Thus, quick vehicle response to movement of operator control levers 16 and 17 results.

The hydrostatic nature of the present invention allows turning of the vehicle through a radius of curvature as distinguished from "stepping" or pivoting about a point. In other words, the wheels on one side may be constantly driven at a rate of rotation greater than the rate of rotation of the wheel on the other side. Thus, the vehicle may be driven through a radius of curvature and, moreover, this maneuver is accomplished without power loss. When the pump displacement of the transmission unit governing the inside wheels is decreased (by decreasing the tilt of the swash plate), as the displacement of the pump in the transmission unit governing the outside wheels is increased, the motor portion of the inside transmission acts as a pump, driven by the slower rotating wheels, while the pump unit of the transmission acts as a motor. The affect of the pump (now acting as a motor) is to assist in rotating the opposite transfer case shaft to thereby aid in driving the pump which governs the outer wheels. Thus, the engine is given assistance in accelerating the drive shaft of the transmission unit for the outside wheels. This is the balance of power feature inherent in the present invention. It provides for maximum efficiency in power use during turning movements.

The modular construction of the present invention makes removal of major components for maintenance, repair or replacement a simple matter. Engine 30, transfer case 31, transmission units 32 and 33, as well as gear boxes 34 and 35 may be individually removed by removal of easily accessible bolts (shown primarily in FIG. 3) without the necessity of removing other components. Thus, maintenance and repair, an integral aspect of operation, may be accomplished with maximum efficiency and minimum "down time."

The operation of valve bank 75 has been described generally above. With reference to FIG. 20, both auxiliary spool 83 and lift spool 30 are operated by a direct linkage to foot pedals 19 and 20 respectively. Tilting of foot pedals 19 and 20 in one direction moves valve spools 83 and 80, respectively, into one actuating position (such as 83a and 80a) direction, and movement of foot pedals 19 and 20 moves the respective associated valve spools through the neutral position and into the other actuating position (83b and 80b). Foot pedals 19 and 20, of course, operate independently.

Foot pedal 18 controls both mid-inlet spool 81 and tilt spool 82. As shown schematically in FIG. 20, foot pedal 18 operates with a mechanical advantage with respect to tilt spool 82 as compared to mid-inlet spool 81. Thus when tilt spool 82 is actuated in either direction, tilt spool 82 is operated first. When tilt spool 82 reaches the limit of movement in one direction or the other, then continued tilting of foot pedal 18 operates mid-inlet spool 81. Thus, tilt spool 82 is always operated first and unless foot pedal 18 is moved to its limit, mid-inlet spool 81 will not be actuated. This provides for fast and slow bucket tilt as described above.

Variations may be made in the form of the invention shown without departinng from its scope which is to be limited only by the scope of the appended claims.

I claim:

1. In a tractor vehicle having an engine in the rear and a pair of ground engaging wheels on each side of said vehicle, the space transversely between the pairs of wheels being greater than the space longitudinally between each wheel of the pairs of wheels on opposite sides of the vehicle hydrostatic means for each pair of wheels to selectively connect said engine to said wheels to propel said vehicle, each of said hydrostatic means comprising:
   a variable displacement pump driven by said engine;
   a hydraulic motor operatively connected to said pump; and
   means for varying the displacement of said pump infinitely between a range of zero to maximum displacement in either forward or reverse directions at a given r.p.m. to thereby drive said wheels on one side of said vehicle independently with respect to said wheels on the other side of said vehicle in forward and reverse directions.

2. The tractor vehicle of claim 1 wherein each of said variable displacement pumps is characterized by a series of revolving pistons and cylinders, said pistons engaging an inclined swash plate, and wherein said means for varying the displacement of each of said pumps at a given r.p.m. consists of means independently operated for varying the plane of said swash plate.

3. The tractor vehicle of claim 2 wherein said means for respectively varying the plane of said swash plate of each of said first and second variable displacement pumps comprises a pair of spaced arms pivotally mounted in said forward space and linkage from said control arms to said respective swash plates.

4. In a tractor vehicle having an engine in the rear and a pair of ground engaging wheels on each side of said vehicle, said pairs of wheels being spaced transversely on opposite sides of vehicle a distance greater than the distance between the front and rear wheels of each pair of wheels, hydrostatic means for each pair of wheels to selectively connect said engine to said wheels to propel said vehicle, each of said hydrostatic means comprising:
   a variable displacement pump driven by said engine;
   a hydraulic motor operatively connected to said pump;
   each of said variable displacement pumps and motors being characterized by a series of revolving pistons and cylinders, said pistons being displaced by an inclinable swash plate;
   means for respectively varying the plane of said swash plate of each of said first and second variable displacement pumps comprising a pair of spaced control arms pivotally mounted in said forward space and linkage from said control arms to said respective swash plates;
   means for varying the rate of change of said plane of said respective swash plates per unit change in the position of said respective control arms including;
   a first link mounted for pivotal movement about a first axis in response to pivotal movement of one of said control arms;
   a second link mounted to said first link for pivotal movement about a second axis spaced from and parallel to said first axis;
   a third link mounted to said second link and extending transversely thereto for pivotal movement about a third axis parallel to and spaced from said second axis a distance substantially equal to the distance from said first axis to said second axis, said third link being mounted for pivotal movement about a fourth axis spaced from and parallel to said third axis; and
   means for incrementally displacing the position of said first axis from a position coincident with said third axis to a position spaced from and parallel thereto.

5. The tractor vehicle of claim 4 wherein said means for incrementally displacing the position of said first axis includes a control arm mounted for pivotal movement about an axis spaced from said first axis and extending into said forward space and means pivotally connecting said control arm to said first link for pivotal movement with respect thereto about said first axis.

6. The tractor vehicle of claim 5 wherein said means for varying the rate of change of said plane of said respective swash plates is mounted on opposite sides of said forward space and said means for incrementally displacing the position of said first axis in each of said sides of said forward space includes a shaft mounted for pivotal movement about an axis spaced from and parallel to said first axis and a pair of links keyed thereto and respectively mounted to each of said first links for pivotal movement about said first axis.

7. The tractor vehicle of claim 6 and linkage means extending from said third link to said swash plate control of each of said first and second variable displacement pumps.

8. In a tractor vehicle having a vehicle body with an engine space at the rear end thereof and a forward space for the vehicle operator's legs at the front end thereof, a seat for the operator mounted on said body intermediate and at an elevation above said engine and said forward space, and a pair of wheels rotatably mounted on opposite sides of said body, the space between wheels transversely on opposite sides of the vehicle being greater than the distance longitudinally between the front and rear wheels of each pair, a substantially modular power system comprising:

a first module consisting of an engine mounted in said engine space;

a second module consisting of a transfer case disposed beneath said seat and having a housing, an input shaft coaxially connected to said engine output shaft, an output shaft spaced from said input shaft, and means for transferring rotational movement of said input shaft to said transfer case ouptut shaft;

third and fourth module, each disposed beneath said seat and each consisting of variable displacement hydrostatic means, the input shaft of one of said variable displacement hydrostatic means being coaxially connected to said transfer case input shaft opposite said engine output shaft, the input shaft of said other variable displacement hydrostatic means being coaxially connected to said transfer case output shaft;

a fifth and sixth module respectively disposed on opposite sides of said body and each consisting of an enclosed compartment having a drive sprocket, a pair of wheel sprockets drivably connected to said pair of wheels and an idler sprocket disposed therein, said drive sprocket being coaxially connected to the respective output shafts of said variable displacement hydrostatic means, the output shaft of said variable displacement hydrostatic means having a rotational axis transverse to the rotational axis of said input shaft of said respective variable displacement hydrostatic means, and endless chain means driven by said drive sprocket and passing around said wheel sprockets at the opposite closed loop ends of said endless chain means for driving said pairs of wheels in forward or reverse directions at variable speeds independently of said other pair of wheels.

9. The tractor vehicle of claim 8 wherein said variable displacement hydrostatic means which comprises said third and fourth modules includes a variable displacement pump having respective input shafts coaxially mounted to said input and output shafts of said transfer case, and a constant displacement hydraulic motor mounted to each of said pumps and having an output shaft having an axis of rotation transverse to the axis of rotation of said input shafts, said output shafts being coaxially connected to said drive sprockets in said fourth and fifth modules respectively.

* * * * *